(12) United States Patent
Papasakellariou

(10) Patent No.: US 7,023,901 B2
(45) Date of Patent: Apr. 4, 2006

(54) SPREADING FACTOR ESTIMATION SYSTEM AND METHOD

(75) Inventor: Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 773 days.

(21) Appl. No.: 10/007,153

(22) Filed: Dec. 4, 2001

(65) Prior Publication Data

US 2002/0131483 A1   Sep. 19, 2002

Related U.S. Application Data

(60) Provisional application No. 60/263,669, filed on Jan. 23, 2001.

(51) Int. Cl.
 *H04B 1/69* (2006.01)
 *H04B 1/707* (2006.01)
 *H04B 1/713* (2006.01)

(52) U.S. Cl. .................. 375/147; 375/130; 375/140; 375/147; 375/260; 375/285; 375/343; 375/367; 455/134; 455/135

(58) Field of Classification Search ............... 375/130, 375/140, 147, 148, 260, 272–278, 285, 343, 375/367; 455/134, 135, 277.2
See application file for complete search history.

(56) References Cited

U.S. PATENT DOCUMENTS

| | | | |
|---|---|---|---|
| 5,619,524 A | 4/1997 | Ling et al. ................ 375/208 |
| 5,659,573 A | 8/1997 | Bruckert et al. ........... 375/200 |
| 6,233,230 B1 | 5/2001 | Chan ......................... 370/335 |
| 6,347,220 B1* | 2/2002 | Tanaka et al. ........... 455/277.2 |
| 6,404,803 B1* | 6/2002 | Wang et al. ............... 375/148 |
| 6,526,065 B1* | 2/2003 | Cheng ....................... 370/441 |
| 6,567,466 B1 | 5/2003 | Ovalekar et al. .......... 375/225 |
| 2002/0057730 A1* | 5/2002 | Karisson et al. .......... 375/152 |

* cited by examiner

*Primary Examiner*—Stephen Chin
*Assistant Examiner*—Erin M. File
(74) *Attorney, Agent, or Firm*—Carlton H. Hoel; W. James Brady; Frederick J. Telecky, Jr.

(57) ABSTRACT

Spreading factor (SF) estimation in a code division multiple access (CDMA) spread spectrum system where the SF of the data channel may change on a frame-by-frame basis to reflect a change in the data rate for each corresponding frame. The SF estimation methods despread the data channel for all possible SF values, perform maximal ratio combining (MRC) when resolved multipaths occur, take the absolute value of the MRC results, and average these absolute values over many symbol periods to obtain decision statistics for the various SF's. The SF estimation methods then post-process these decision statistics and make a SF decision.

15 Claims, 11 Drawing Sheets

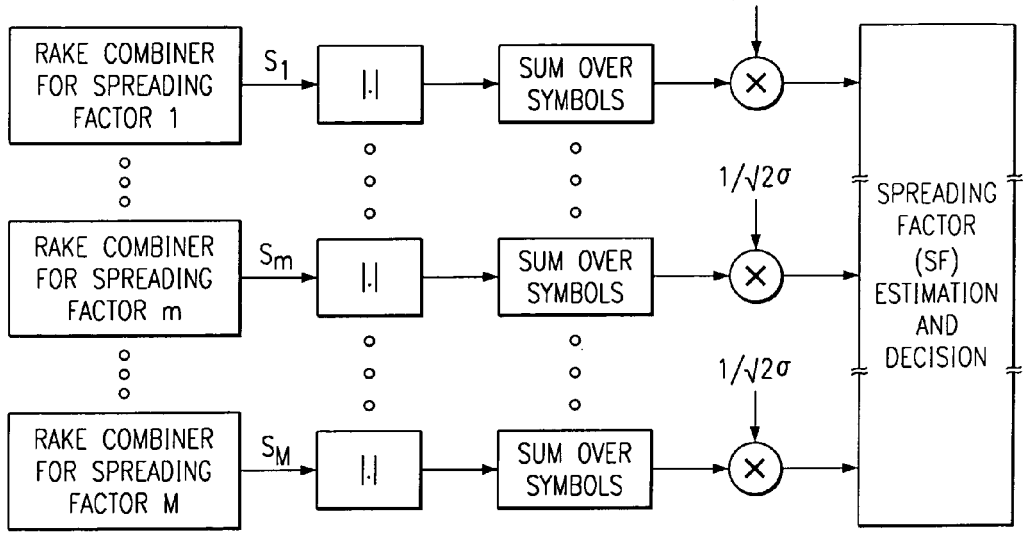
FIG. 3
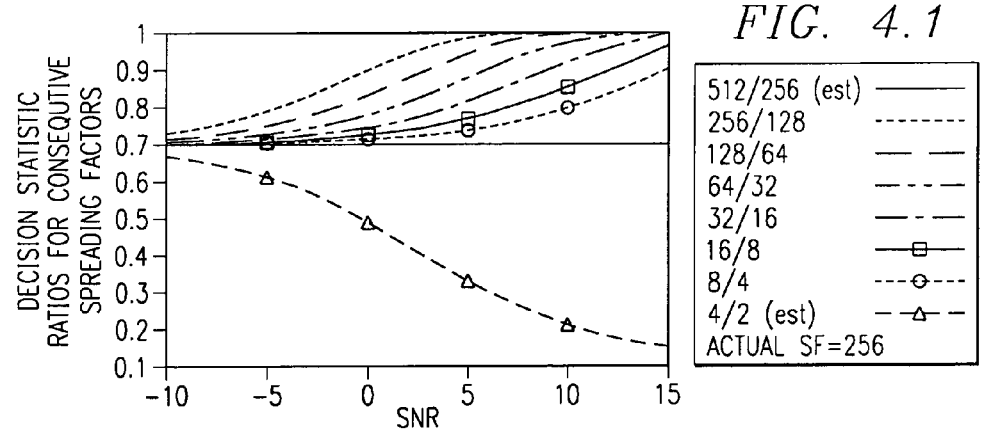
FIG. 4.1
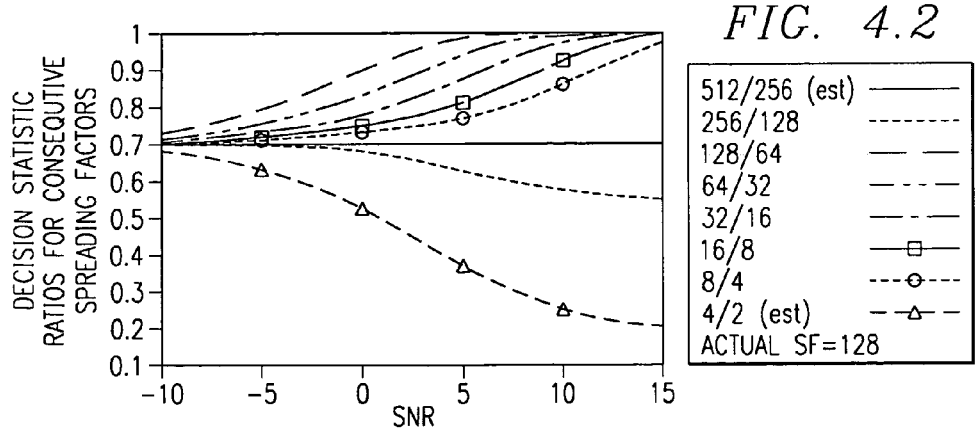
FIG. 4.2

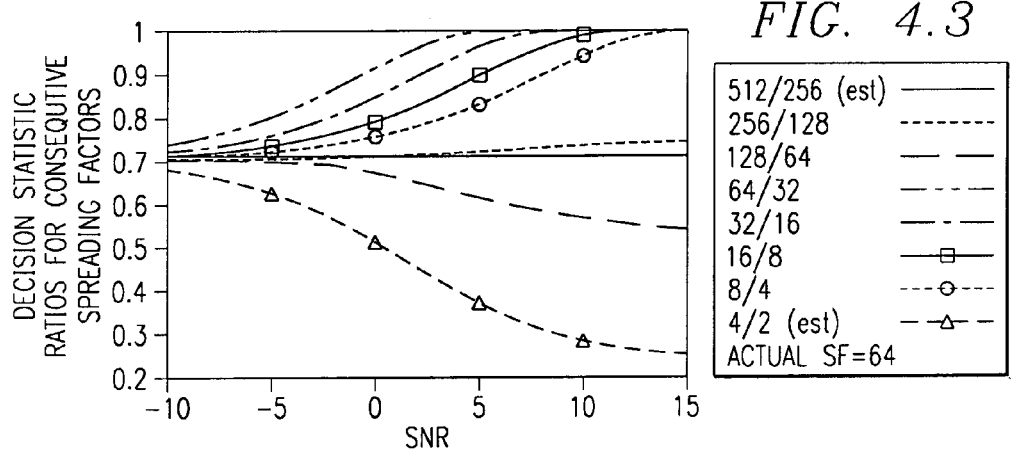
FIG. 4.3
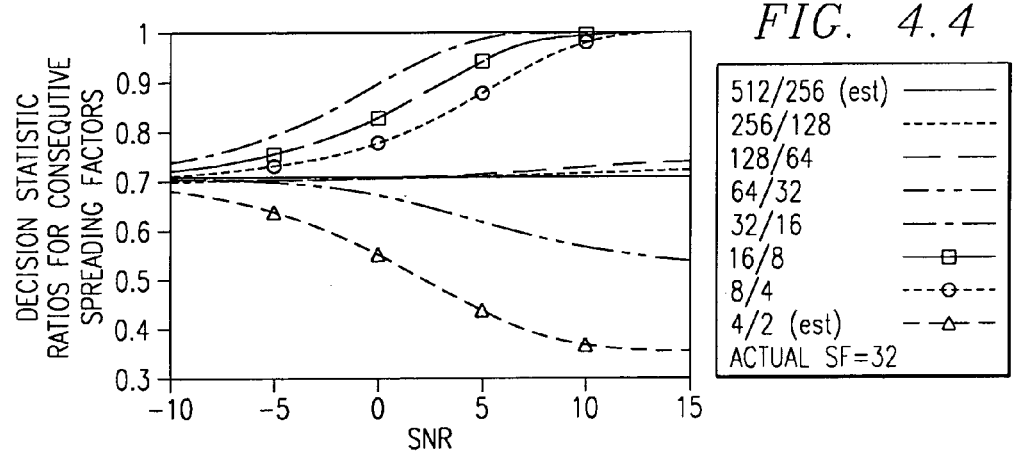
FIG. 4.4
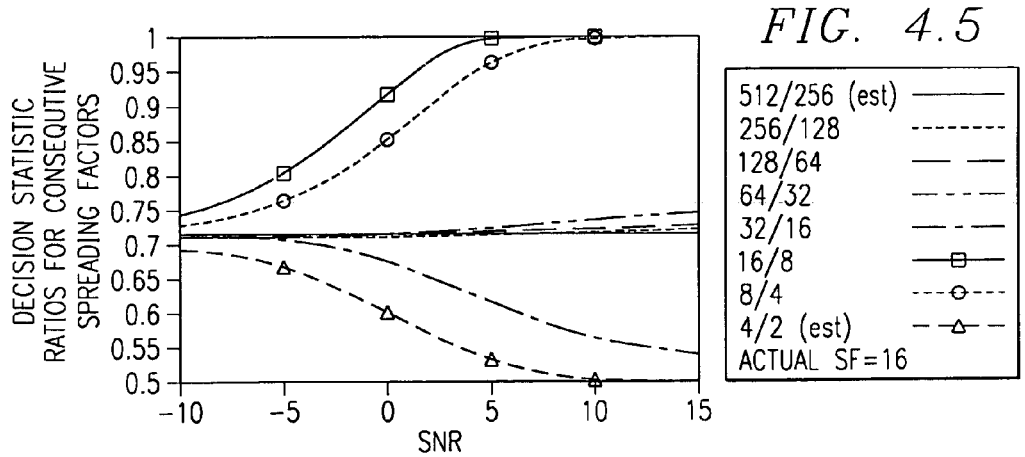
FIG. 4.5

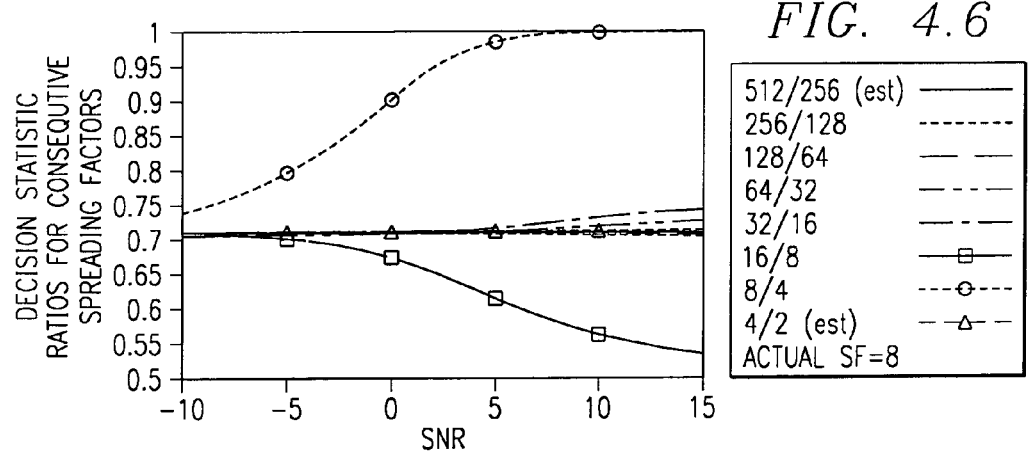
FIG. 4.6
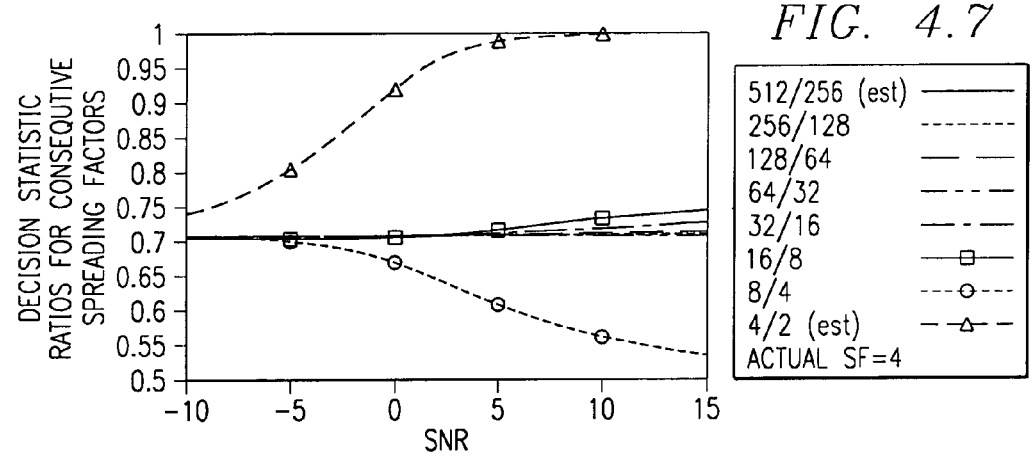
FIG. 4.7
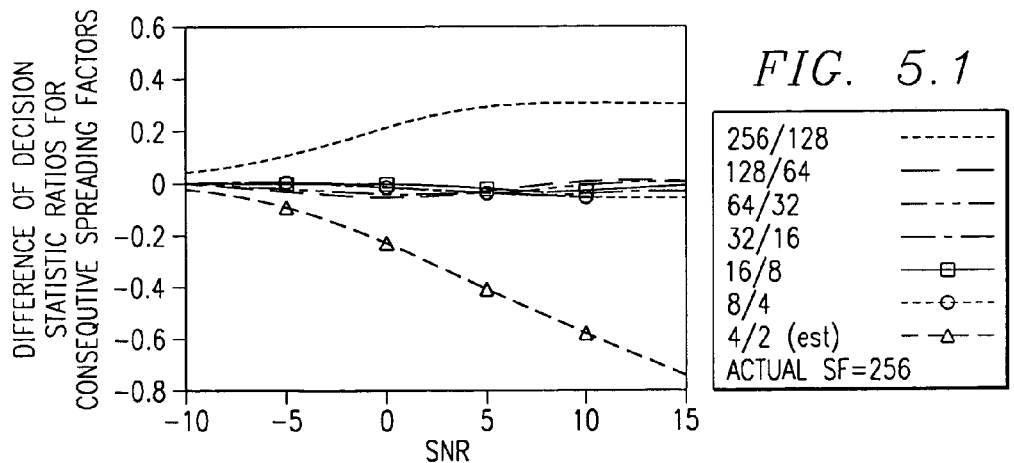
FIG. 5.1

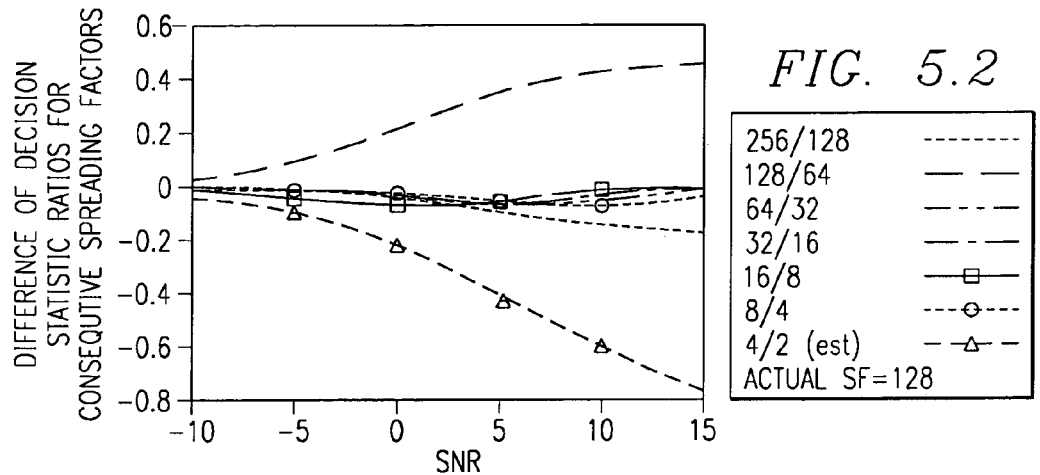
FIG. 5.2
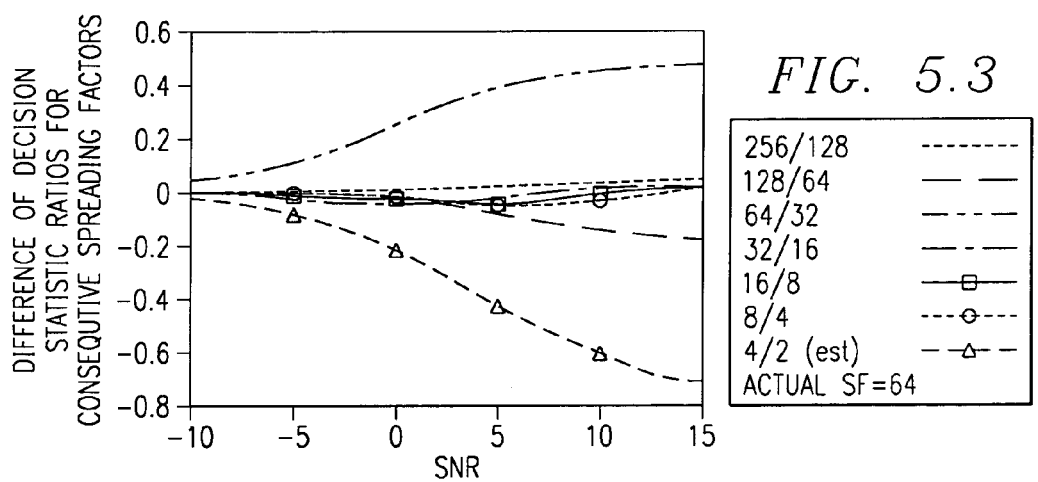
FIG. 5.3
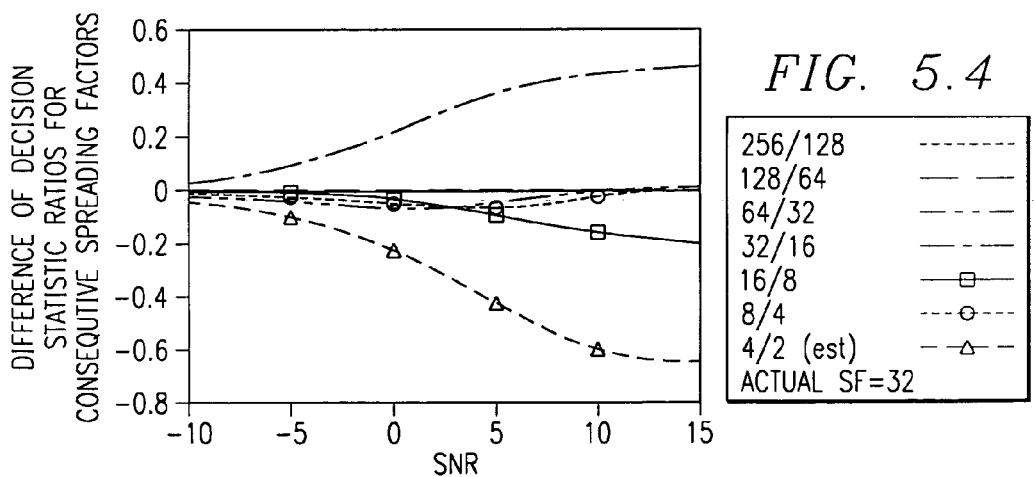
FIG. 5.4

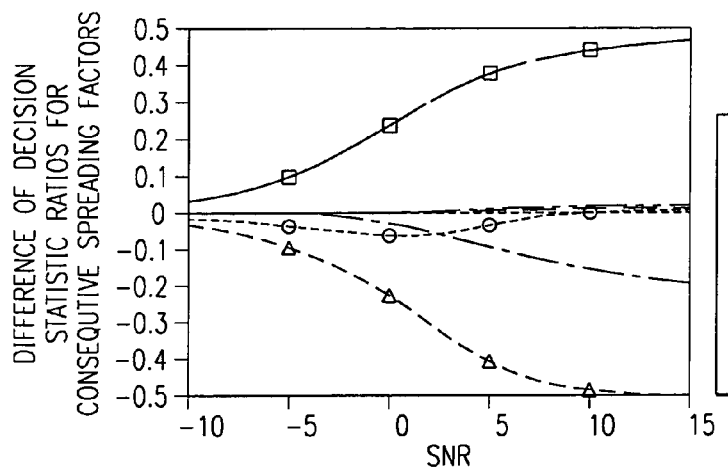
FIG. 5.5
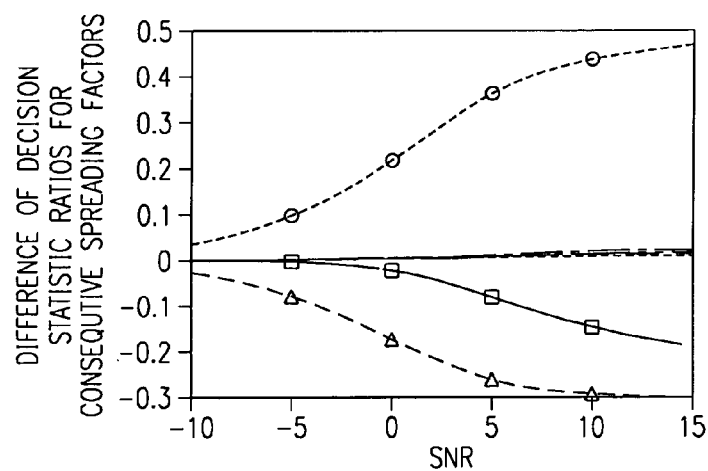
FIG. 5.6
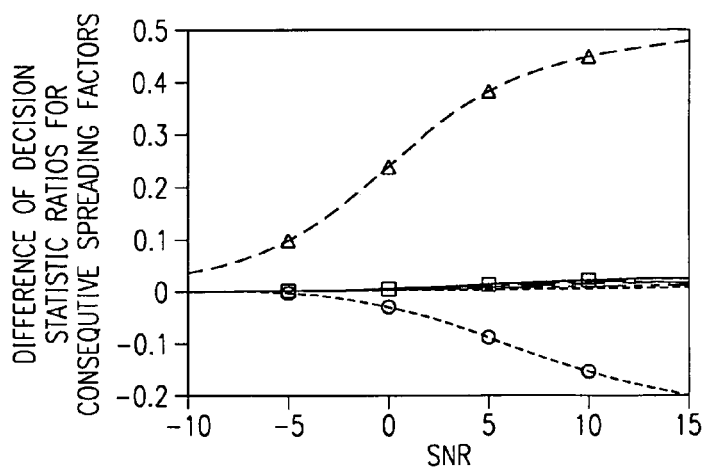
FIG. 5.7

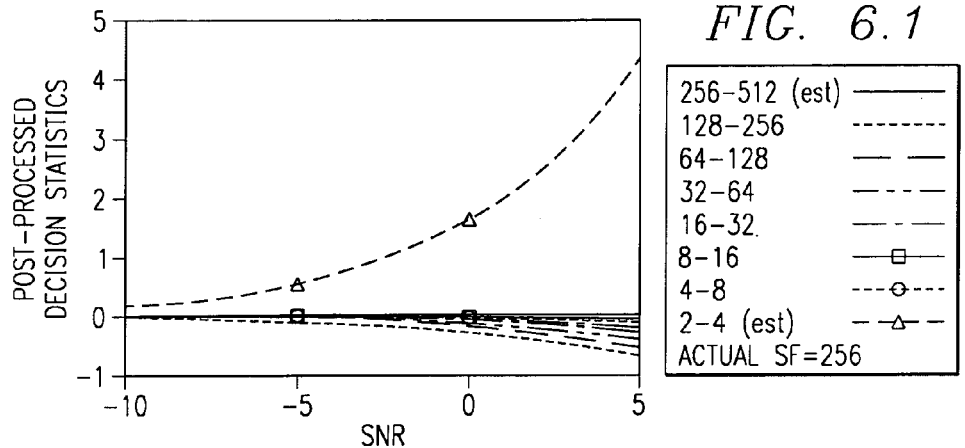
FIG. 6.1
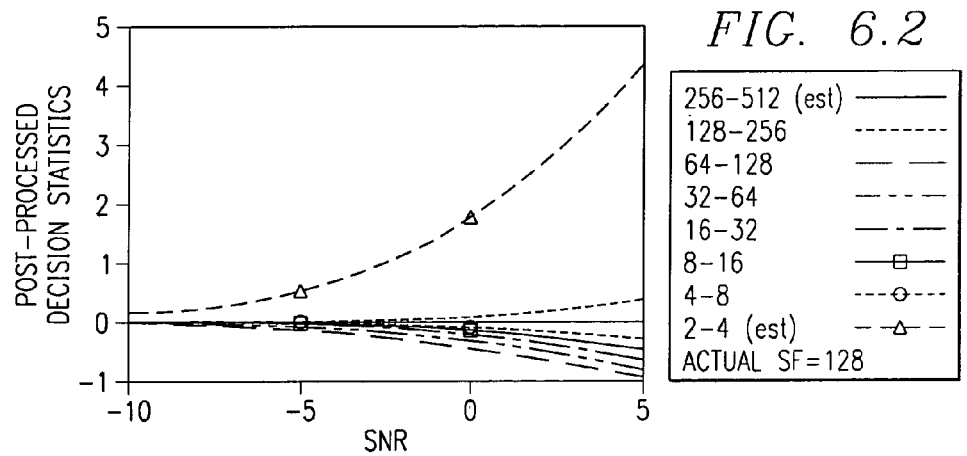
FIG. 6.2
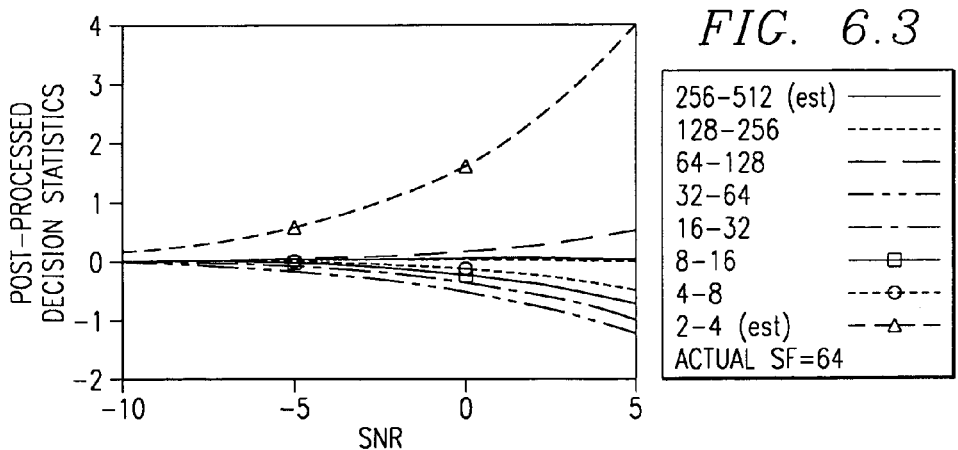
FIG. 6.3

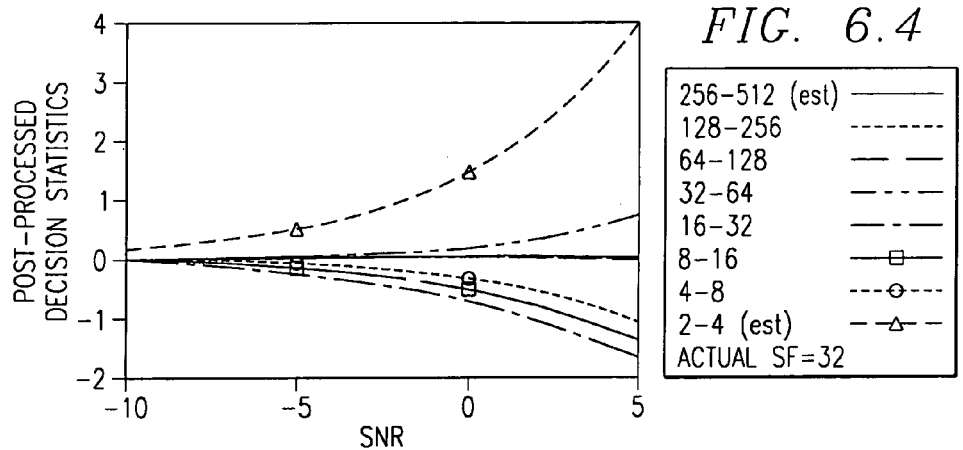
FIG. 6.4
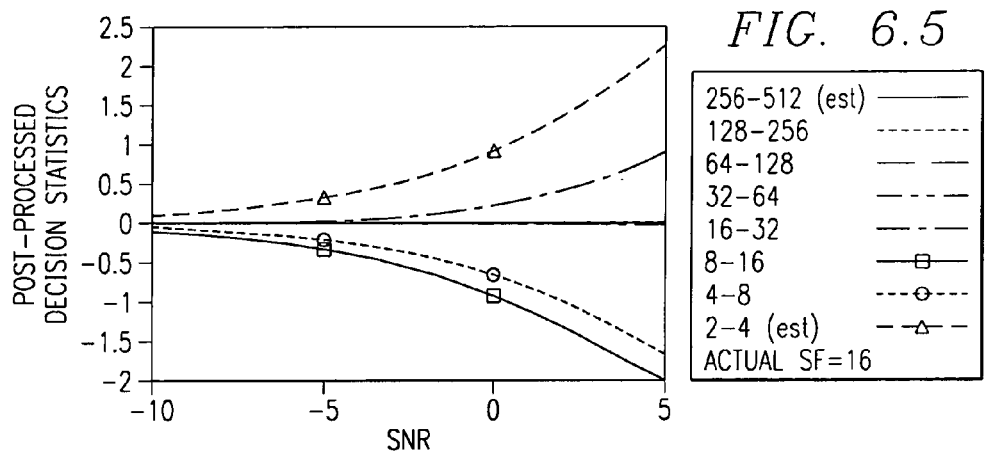
FIG. 6.5
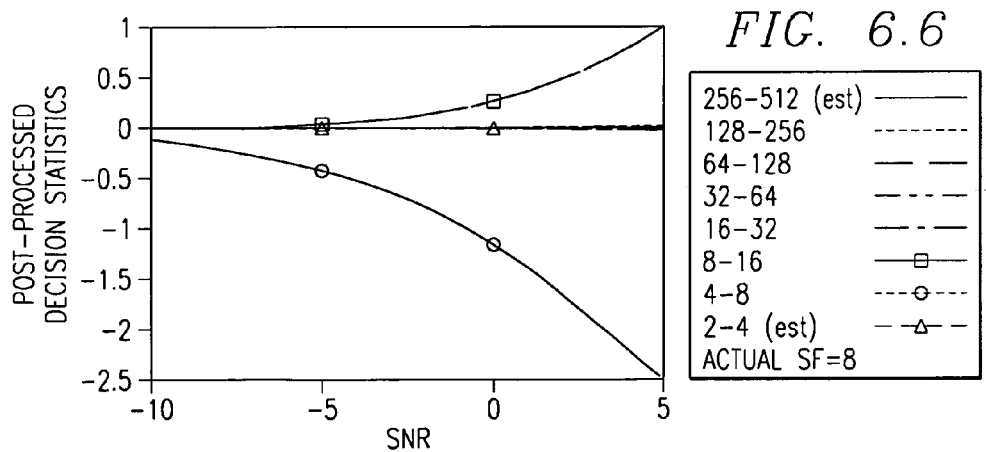
FIG. 6.6

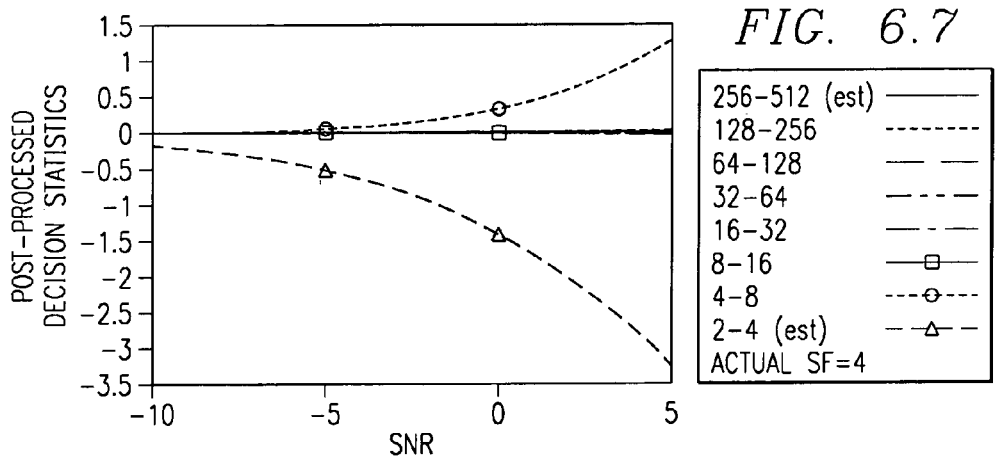
FIG. 6.7
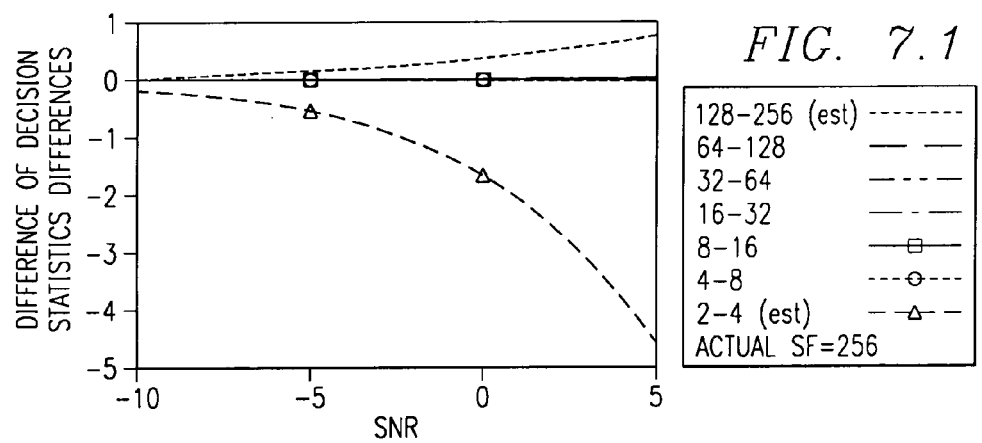
FIG. 7.1
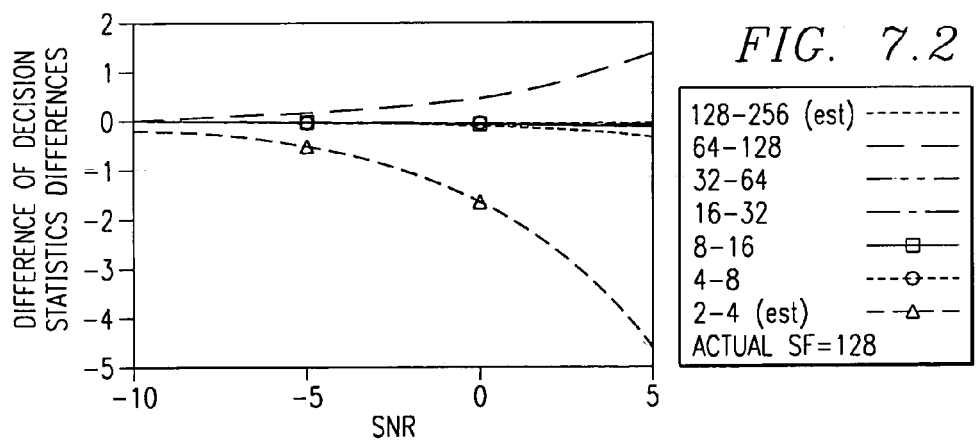
FIG. 7.2

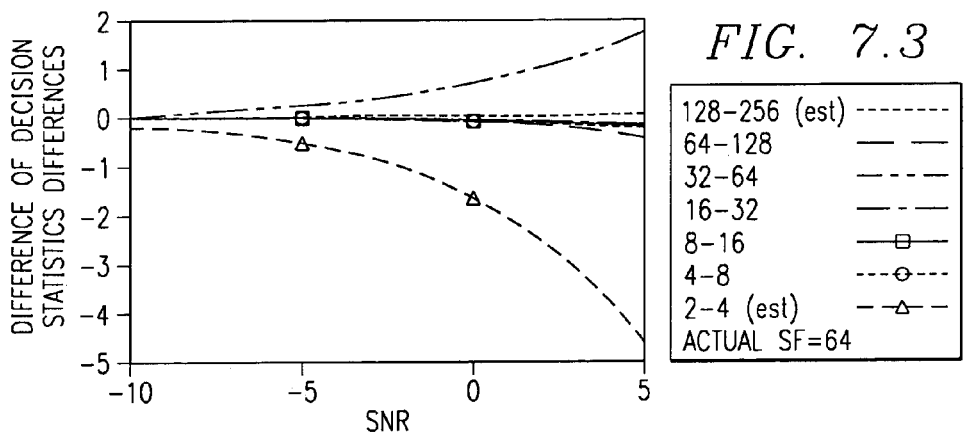
FIG. 7.3
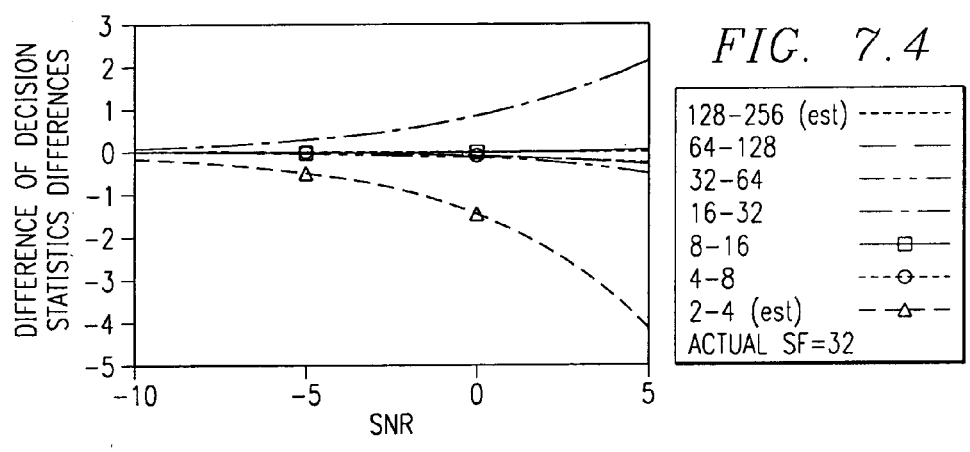
FIG. 7.4
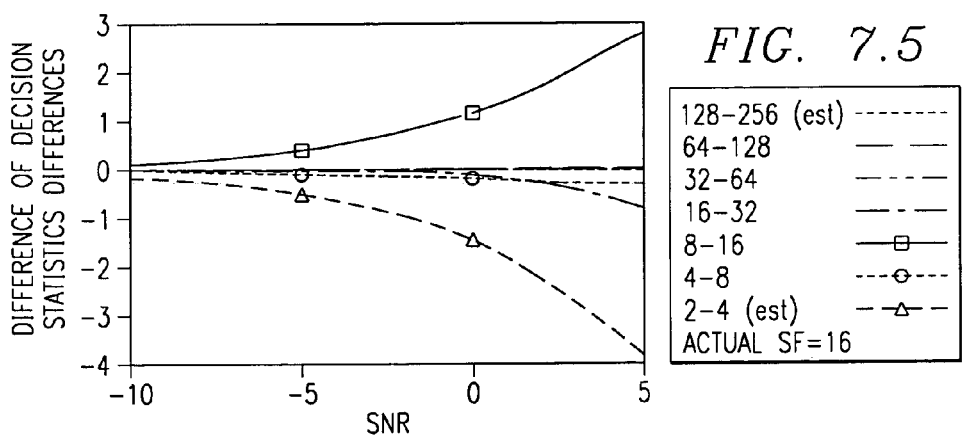
FIG. 7.5

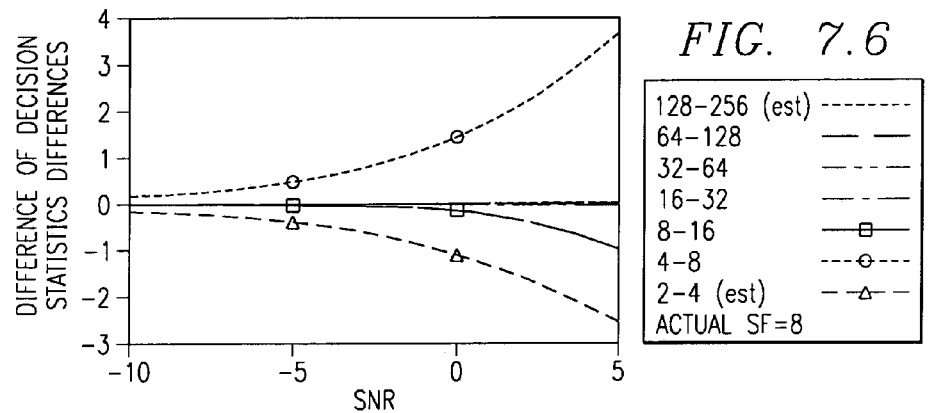
FIG. 7.6
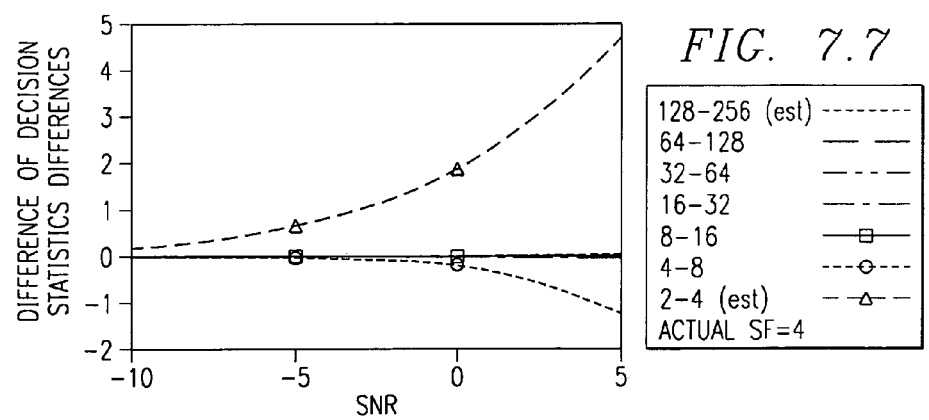
FIG. 7.7

SPREADING FACTOR ESTIMATION SYSTEM AND METHOD

CROSS-REFERENCE TO RELATED APPLICATIONS

This application claims priority from provisional applications: Ser. No. 60/263,669, filed Jan. 23, 2001. The following patent application discloses related subject matter: Ser. No. 10/176,156, filed Jun. 20, 2002. These referenced applications have a common assignee with the present application.

BACKGROUND OF THE INVENTION

The invention relates to electronic communications, and more parrticularly to CDMA-based coding, transmission, and decoding/synthesis methods and circuitry.

Code division multiple access (CDMA) coding has been extensively used in such applications as cellular and satellite communications. CDMA signals increase the spectrum required for the transmission at a particular data rate by modulating each data symbol with a spreading code having a rate larger than the data rate. The same spreading code is used for each data symbol. Typically, the spreading code comprises of a few tens or a few hundreds of elements, called chips. To decrease the correlations among spreading codes assigned to different users, and thereby reduce the interference among different users, the data stream after spreading is typically scrambled with a pseudo-noise (PN) code that is generated serially and cyclically and has a larger period than the spreading code. Examples of such CDMA signal spreading are the schemes used by the IS-95/CDMA2000 and 3GPP systems.

With CDMA, the signals from all users simultaneously occupy the same frequency band, and the receiver separates the multiple signals by exploiting the crosscorrelation properties of the spreading and scrambling codes that are applied to each user's signal. The receiver attempts to match in time the spreading and scrambling codes of the desired signal with a replica of these codes. Only then the demodulation result is meaningful; otherwise it appears noise-like. Thus, if the arriving signals have different codes or different code offsets, they can be discriminated at the receiver. The CDMA code for each user is typically produced as the modulo-2 addition of a Walsh code with a pseudo-random code (two pseudo-random codes for QPSK modulation) to improve the noise-like nature of the resulting signal. A cellular system cell as illustrated in FIG. 1 could employ IS-95 or 3GPP for the air interface between the base station and the mobile user station.

The 3GPP system employs a 3.84 MHz bandwidth (a chip duration of 260 ns), and the spreading code length applied to each data symbol may vary from 4 chips to 256 chips. The number of chips per symbol is called the spreading factor (SF), and the SF stays constant during each 10 ms duration frame. However, the SF may change from frame to frame. Each frame is partitioned into 15 time slots (0.667 ms duration) with each time slot consisting of 2560 chips. Thus the number of data symbols per slot ranges from 10 to 640, and the number of data symbols per frame ranges from 150 to 9600.

In the 3GPP frequency division duplex (FDD) mode uplink, the Dedicated Physical Control Channel (DPCCH) is always spread by the code $c_c = C_{ch,256,0}$ with SF=256 while the Dedicated Physical Data Channel (DPDCH) is spread by the code $c_{d,1} = C_{ch,SF,k}$ where k=SF/4 is the code number.

Note that 3GPP uplink uses QPSK modulation with single-channel DPDCH and DPCCH being in phase and quadrature, respectively. The recursion defining even-numbered channel codes is concatenation: $C_{ch,2^{n+1},2k} = C_{ch,2^n,k}, C_{ch,2^n,k}$ with initial code $C_{ch,4,1} = $ "+1,+1,−1,−1". Thus a consequence of the code selection k=SF/4 is that for two codes with SF's of length $SF_1$ and $SF_2$, where $SF_1 < SF_2$, the part of the code for $SF_2$ consisting of the first $SF_1$ chips is identical to the code for $SF_1$. In the uplink of 3GPP, the SF may take the values $2^i$, i=2,3,4,5,6,7,8. Because the code used for different SF's is a repetition of the code for SF=4, despreading for all possible SF's can be combined in a single process and as a result the number of despreaders need not increase.

The data rate and the SF used in each frame are specified by the Transport Format Control Indicator (TFCI) field that is transmitted in the DPCCH control channel. The DPCCH control channel consists of 15 time slots per frame, and the TFCI bits are time-multiplexed, together with other control information, among the 15 slots. The DPCCH control channel is always spread by the all-zero code ("+1,+1,+1, ... +1,+1") with SF=256 and can therefore be always despread once the received signal paths have been identified through a searching process at the receiver. By despreading the DPCCH control channel, at the end of a frame the receiver knows all of the TFCI symbols and can determine the data rate and the SF of the DPDCH data channel. Therefore, in order to despread the DPDCH data channel, the received data need to be stored for one entire frame period before despreading. Once the SF becomes known, the stored data need to be quickly transferred to the baseband part of the receiver to reduce the associated processing delay.

Thus the known method needs to store an entire frame prior to despreading and baseband processing; this requires large front-end memory, large data rate transfers between front-end memory and hardware and creates processing delay.

SUMMARY OF THE INVENTION

The present invention provides estimation of the spreading factor in less than a frame by despreading with a plurality of spreading factors and estimating the actual spreading factor from the despreading results.

The preferred embodiment SF estimation methods have advantages including substantially reducing the requirements of large memory, high data rate transfers, and processing delay. Also, the preferred embodiment implementations of the estimation methods only require functions (e.g., despreading and Rake combining) that already exist in an uplink receiver.

BRIEF DESCRIPTION OF THE DRAWINGS

The drawings are heuristic for clarity.

FIG. 3 is a block diagram for the initial decision statistics after Rake combining of the preferred embodiment SF estimation methods.

FIGS. 4.1–4.7 show a set of decision statistics for a first preferred embodiment SF estimation method.

FIGS. 5.1–5.7 show another set of decision statistics for a first preferred embodiment SF estimation method.

FIGS. 6.1–6.7 show a set of decision statistics for a second preferred embodiment SF estimation method.

FIGS. 7.1–7.7 show another set of decision statistics for a second preferred embodiment SF estimation method.

DETAILED DESCRIPTION OF THE PREFERRED EMBODIMENTS

1. Overview

Figure 2:
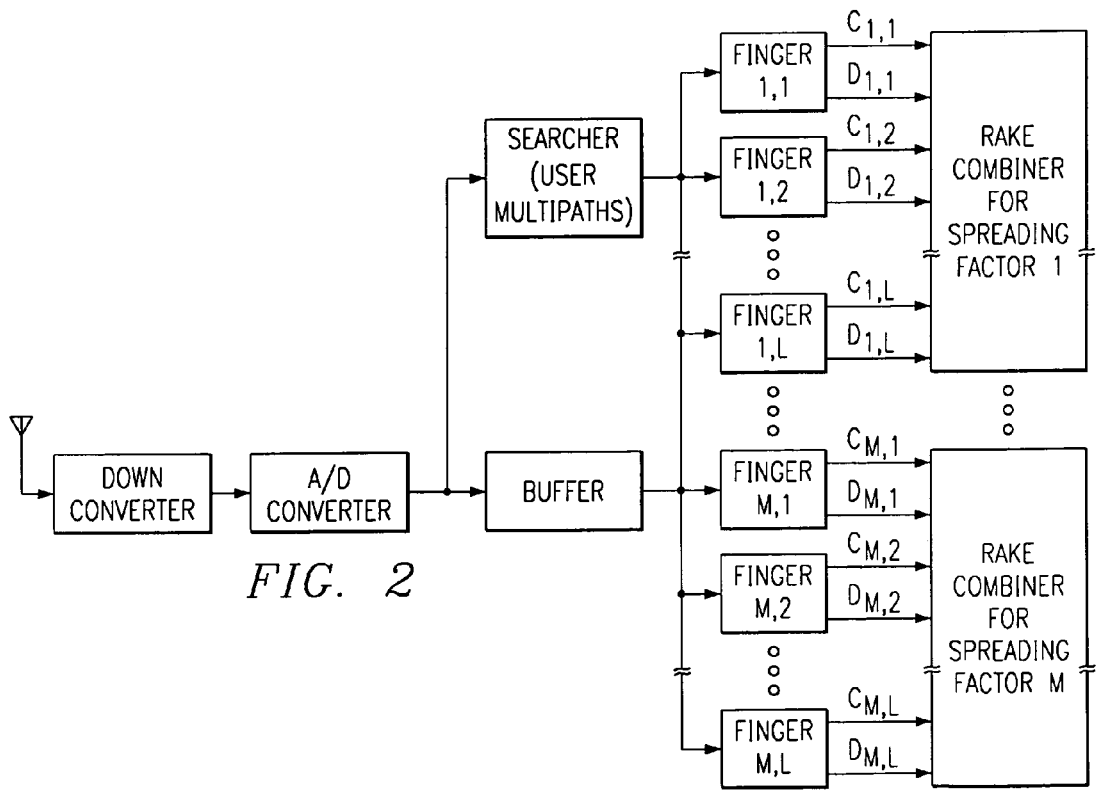
FIG. 2 is a block diagram of a conventional spread spectrum CDMA Rake receiver with despreading performed for every possible spreading factor.

Preferred embodiment methods estimate received CDMA signals' spreading factor (SF) from a plurality of despreadings with hypothesized SF's and decide on an SF after a specific observation period ensuring a sufficiently small error probability. FIGS. 2–3 show functional blocks for some preferred embodiment systems using preferred embodiment methods. The preferred embodiment methods may be implemented on programmable processors (such as DSP's) or in specialized circuits (ASIC's) or combinations such as system-on-a-chip with attendant analog-digital signal components.

2. 3GPP Preferred Embodiments Setup

Figure 1:
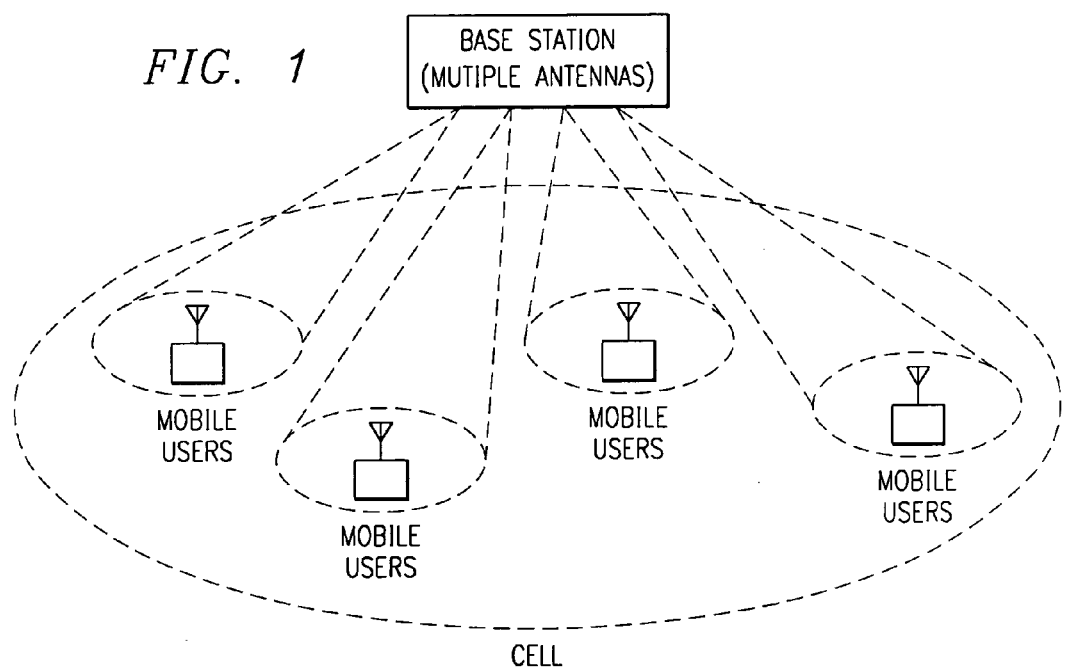
FIG. 1 is a diagram of a typical communications cell comprising of several users and a base station.

The first preferred embodiment methods and systems relate to the base station receiver and the uplink in a 3GPP code division multiple access (CDMA) communication system. FIG. 1 illustrates a typical cell in a CDMA communication system where several mobile users communicate with a base station.

For 3GPP the 10 ms frame period is divided into 15 time slots with 2560 chips per slot. There are ten Dedicated Physical Control Channel (DPCCH) symbols in each slot, and each symbol extends over 256 chips (spreading factor of 256). Those symbols may be for pilot, TFCI, power control, and feedback information for transmit antenna diversity. The DPCCH always has a spreading factor (SF) equal to 256 and uses the all-zero Walsh code.

In contrast, the number of Dedicated Physical Data Channel (DPDCH) symbols in each slot depends upon the SF and may vary from 10 for SF=256 to 640 for SF=4; although the spreading factor remains constant throughout a frame. That is, the 2560 chips of a slot may be partitioned into from 10 to 640 symbols with 256 to 4 chips per symbol and yield corresponding data rates of from 15 to 960 ksymbols/s.

FIG. 2 schematically shows a first part of preferred embodiment receiver circuitry used for SF estimation. For a particular user, let the total number of possible spreading factors (SF's) be denoted M and the number of received separable multipaths be denoted L. Typically, M=7 and L=1–6. For each mobile user of unknown SF, the SF estimation circuitry consists of M Rake receivers, one for each of the possible M SF's. Only one of the M Rake receivers would exist if the SF were known for a user (and no SF estimation would be necessary for this user). The receiver includes a plurality of despreaders, a plurality of timers, a plurality of spread spectrum processors, and a plurality of adders. Users' signals are received at the antenna and subsequently downconverted and digitized. Since the various user SF's are not known, the received signal samples need to be stored in buffer memory until the SF is determined and despreading can occur. The searcher identifies the multipaths for each user. Subsequently, L identified paths for each user's signal are passed to the despreaders (groups of L fingers for each SF). Each despreader (or finger) uses a replica for a possible spreading code which is appropriately delayed in time to synchronize with the corresponding multipath. The $1^{st}$ despreader output for the $1^{st}$ path of the $m^{th}$ possible SF is denoted as $D_{m,1}$. Each despreader also includes a chip-code signal generator, a modulo-2 adder, and a summer. In addition to the despread signal paths, each despreader (possibly together with another unit) also provides a channel medium estimate for the corresponding path of a user's signal ($C_{m,1}, \ldots, C_{m,L}$ for the $m^{th}$ SF). The channel medium estimates are needed by the conventional Rake receiver to combine the L multipaths. In the 3GPP uplink, the channel medium estimate and the search may be based on the pilot symbols that are embedded in the DPCCH control channel; and each user having a differing scrambling code allows for the user separation. After despreading, the multipaths of the signal for each user and the corresponding channel medium estimates are provided to a Rake receiver for decision. The $m^{th}$ Rake receiver performs maximal ratio combining (MRC) on the multipath components of the signal and provides soft output $S_m$ for the $m^{th}$ SF. It should be noted that the actual despreading process for all M possible SF's can be performed by a single despreading unit which can produce intermediate despreading results for the smaller SF's before completing the despreading process for the largest SF. This means that the total number of despreaders needed for all M possible SF's is equal to the number of multipaths L for the particular user and there is no increase in the hardware complexity associated with the despreading operation. For clarity purposes, M replicas of such despreaders are shown in FIG. 2.

For the $m^{th}$ spreading factor, sum the absolute values of the Rake soft output $S_m$ over a number of symbol periods (or over a number of slots); see FIG. 3. The number of slots is selected so that the error probability for the SF estimation methods is substantially smaller than the frame error rate (FER) and comparable to the TFCI decoding error rate. Also, the number of slots required to achieve the desired performance for the SF estimation methods will determine the size of the memory required to store the received signal samples (FIG. 2, buffer memory) and the ensuing data transfer rate and processing delay. Thus, the number of slots should be minimized, subject to the condition of achieving the desired performance for SF estimation, and in 3GPP it should not exceed 15 slots which is the frame period. After summation, the results may be divided by the square-root estimate of the noise and interference variance during the summation period; see the multipliers in FIG. 3. This is an optional operation that makes the values of the decision statistics dependent on the signal-to-noise ratio (SNR) as it will be later shown. Finally, the decision statistics are provided to the SF estimation (decision) unit for further processing and for a decision regarding the SF. This processing in the SF estimation unit defines the SF estimation method. Two preferred embodiment methods and the decision process are described in the following sections.

In the 3GPP uplink, the channel medium estimate and the search may be based on the pilot symbols that are embedded in the Dedicated Physical Control Channel (DPCCH). The DPCCH always has a SF of 256 and uses the all-zero Walsh code. For that reason, the channel medium estimate will be the same for all of the M Rake receivers ($C_{1,1}=C_{2,1}= \ldots =C_{M,1}$) and may be computed only once. The different SF's are applied to the Dedicated Physical Data Channel (DPDCH) and the M Rake receivers operate on the data channel. In 3GPP a single DPDCH is spread by the code $c_{d,1}=C_{ch,SF,k}$ where k=SF/4. A consequence of this specification is that the code employed in the DPDCH is known once the SF is known.

Despreading with a hypothetical $SF_1$ that is smaller than the actual $SF_2$ produces a decision statistic that is part of the actual one. Accumulating the decision statistic for $SF_1$ over $SF_2/SF_1$ intervals produces the actual statistic obtained by despreading with the code corresponding to $SF_2$. This property allows despreading to occur with SF=4 for all possible SF's and the partial despreading results to be combined once the actual SF is known.

Despreading with a hypothetical $SF_1$ which is larger than the actual $SF_2$ will produce a decision statistic that may contain all or parts of the $SF_1/SF_2$ decision statistics for the actual $SF_2$ depending on the combination of $SF_1/SF_2$ data symbols for $SF_2$. If all $SF_1/SF_2$ data symbols for $SF_2$ are identical, then the decision statistic obtained after despreading with $SF_1$ will be identical with the sum of $SF_1/SF_2$ decision statistics obtained by despreading with $SF_2$. If those data symbols are not identical, cancellations will occur during the despreading with $SF_1$ and the absolute value of the resulting decision statistic will be smaller than the one obtained by summing the $SF_1/SF_2$ absolute values obtained by despreading with $SF_2$. This property of statistical averaging will be exploited by the preferred embodiment SF estimation methods. Its validity relies on the fact that the decision statistics (symbols from MRC for the SF hypotheses) will be obtained over several slots.

Based on these observations, preferred embodiment SF estimation methods are based on the statistical properties of the resulting decision statistics. SF estimation thus becomes a detection problem with M hypotheses (M≤7). For an additive white Gaussian noise (AWGN) channel, SF estimation for minimum error probability is based on the likelihood ratio test (LRT). For normalized variance $\sigma^2$, the LRT simply chooses the largest of the likelihood metrics $$L_i = ln(P_i) - (|S_i| - \mu_i)^2/(2\sigma^2), \quad i=1,2,\ldots,M, \qquad (1)$$

where ln(.) is the natural logarithm, $P_i$ is the a priori probability for hypothesis i (i.e., the hypothesis that the actual spreading factor equals $SF_i$), $S_i$ is the output from the $i^{th}$ Rake receiver using MRC, $\mu_i$ is the mean, and $\sigma^2$ is the common variance (after some normalization). If the a priori probabilities are the same for all possible SF's, the $ln(P_i)$ terms can be omitted from the likelihood metrics. Also, because the DPDCH data channel is modulated, use the absolute value $|S_i|$ of the Rake output. Although, by taking the absolute value of the Rake output, the resulting distribution is no longer Gaussian (it is Rician), the LRT in (1) is still applicable to the SF estimation problem as it will become apparent in the following.

Because the typical signal-to-noise ratio (SNR) of $E_s/N_o$ in 3GPP ranges between 0 and 6 dB, after one symbol for the correct hypothesis (i.e., SF value) $\mu_i^2/2\sigma^2$ ranges between 0.5 and 2 due to $\mu_i^2 = E_s/2$ and $2\sigma^2 = N_o$. The probability $P_F$ of incorrect SF estimation for such SNR values is much larger than the typical FER values in 3GPP. Moreover, because of fading and power control errors, even for much larger SNR values, $P_F$ can be prohibitively large if the decision statistic is obtained after only one despread symbol. Therefore, the absolute values of the Rake outputs should be accumulated over a number, P, of symbol periods.

If $S_i$ is a Gaussian-distributed random variable with mean $\mu_i$ and variance $\sigma_i^2$, then $|S_i|$ has a Rice distribution with mean $$E[|S_i|] = \mu_i \, erf(\mu_i/\sqrt{2\sigma_i}) + \sqrt{(2/\pi)} \sigma_i \exp(-\mu_i^2/2\sigma_i^2)$$

and variance $$Var[|S_i|] = \sigma_i^2 + \mu_i^2 - E[|S_i|]^2.$$

The error function, erf(.), is defined as $erf(x) = (2/\sqrt{\pi}) \int_{[0,x]} \exp(-y^2) dy$. Notice that when $\mu_i^2/2\sigma_i^2 > 2$ (i.e., SNR>3 dB), then $E[|S_i|] \to \mu_i$ and $Var[|S_i|] \to \sigma_i^2$. However, in 3GPP, because of fading and power control errors, the SNR may fall considerably below 3 dB and the previous approximation will not be valid in general, and especially for low SNR's where blind SF estimation is most difficult.

Decision statistics (DS) will be obtained by summing the absolute values of the Rake outputs, $|S_i|$, over P symbol periods. Thus, the decision statistic for the ith hypothesis, $DS_i = (1/P)\Sigma|S_i|$. The central limit theorem (CLT) implies each $DS_i$ is Gaussian distributed. The CLT is applicable because P will typically exceed 40 (smallest number of symbols per slot is 10 at the value for SF=256, and the observation period is 4 slots). Its distribution (pdf) will therefore be completely known if its mean and variance are known. The next step then is to find the mean and variance of the decision statistics for each of the M hypotheses. As was previously noted, the despreading result for each hypothesized SF depends on whether the actual SF is larger or smaller that the hypothesized SF. Therefore, the mean and variance of the decision statistics will depend on the actual SF as detailed in the following sections.

3. Decision Statistic Mean and Variance for Actual SF Larger than Hypothesized SF First consider the case of when the actual $SF_2$ is larger than the hypothesized $SF_1$. While accumulating the $DS_2$ over P $SF_2$ symbol periods, $DS_1$ is accumulated over $(SF_2/SF_1)P$ $SF_1$ symbol periods. Since $\mu_2 = (SF_2/SF_1)\mu_1$ and $\sigma_{SF2} = (SF_2/SF_1)^{1/2} \sigma_{SF1}$, the mean of $DS_2$ is $$E[|S_2|] = \mu_2 \, erf(\mu_2/\sqrt{2\sigma_2}) + \sqrt{(2/\pi)} \sigma_2 \exp(-\mu_2^2/2\sigma_2^2)$$

Normalizing with $\sqrt{2}/\sigma_2$ yields:

$$E[|S_2|] = \sqrt{SNR} \, erf(\sqrt{SNR}) + \sqrt{1/\pi} \exp(-SNR)$$

and the mean of $DS_1$ is $$E[|S_1|] = (SF_1/SF_2)\mu_2 \, erf(\mu_2 \sqrt{(F_1/SF_2)}/\sqrt{2\sigma_2}) + \sqrt{(SF_1/SF_2)} \sqrt{(2/\pi)} \sigma_2 \exp(-\mu_2^2(SF_1/SF_2)/2\sigma_2^2)$$

Multiplying $E[|S_1|]$ by $SF_2/SF_1$ to account for the longer averaging for $DS_1$ yields $$E[|S_1|] = \mu_2 \, erf(\mu_2 \sqrt{(SF_1/SF_2)}/\sqrt{2\sigma_2}) + \sqrt{(SF_2/SF_1)} \sqrt{(2/\pi)} \sigma_2 \exp(-\mu_2^2(SF_1/SF_2)/2\sigma_2^2)$$

or $$E[|S_1|] = \sqrt{SNR} \, erf(\sqrt{(SF_1/SF_2)} \sqrt{SNR}) + \sqrt{(SF_1/SF_2)} \sqrt{1/\pi} \exp(-(SF_1/SF_2)SNR)$$

In general, the difference between the means increases as the SNR increases and as the ratio of the spreading factors increases.

The variance of $DS_2$ is $$Var[|S_2|] = \sigma_2^2 + \mu_2^2 - E[|S_2|]^2.$$

$$= \sigma_2^2 + \mu_2^2 - [\mu_2 \, erf(\mu_2/\sqrt{2\sigma_2}) + \sqrt{(2/\pi)}\sigma_2 \exp(-\mu_2^2/2\sigma_2^2)]^2$$

The variance of $DS_1$ is $$Var[|S_1|] = (SF_1/SF_2)\sigma_2^2 + (SF_1/SF_2)^2 \mu_2^2 - E[|S_1|]^2.$$

Since $DS_1$ is accumulated $SF_2/SF_1$ times more than $DS_2$ and the result is scaled by $(SF_1/SF_2)^{1/2}$, the variance of $DS_1$ is $$Var[|S_1|] = \sigma_2^2 + \mu_2^2 - [\mu_2 \, erf(\sqrt{(SF_1/SF_2)} \mu_2/\sqrt{2\sigma_2}) + \sqrt{(SF_1/SF_2)} \sqrt{(2/\pi)} \sigma_2 \exp(-(SF_1/SF_2)\mu_2^2/2\sigma_2^2)]^2$$

It should be noted that since $SF_2$ is not known, the normalizing factor $\sqrt{2}\sigma_2$ is also not known. For that reason, a reference variance computed over a 256-chip interval can be used. The effect of this is simply to progressively divide the decision statistics by powers of $\sqrt{2}$. Thus, the DS for SF=256 is divided by 1.0, the DS for SF=128 is divided by $\sqrt{2}$, the DS for SF=64 is divided by 2, the DS for SF=32 is divided by $2\sqrt{2}$, the DS for SF=16 is divided by 4, the DS for SF=8 is divided by $4\sqrt{2}$, and the DS for SF=4 is divided by 8. In general, the decision statistics are in effect divided by $(\sqrt{2})^{i-8}$ where SF=$2^i$, i=2, 3, . . . , 8. Notice that this normalization takes place automatically when dividing with $\sqrt{2}\sigma_{256}$. The reason for dividing by $\sqrt{2}\sigma_2$ is to make the decision statistics dependent on the SNR and thus to be able to know their theoretical values based on the measured SNR. Measuring the variance $\sigma_2$ is needed for power control purposes in 3GPP and it is not a computation introduced by the preferred embodiment SF estimation. Also, as shown in the following, this normalization is not necessary for the preferred embodiment SF estimation methods.

4. Decision Statistic Mean and Variance for Actual SF Smaller than Hypothesized SF In contrast to the foregoing section, now consider the case of actual $SF_2$ smaller than hypothesized $SF_1$. The value of the decision statistic for the hypothesized $SF_1$ depends on the transmitted data symbols since despreading with $SF_1$ occurs over several $SF_2$ symbols. Since the absolute value of the despread signal is taken, the mean of $DS_1$ does not depend on the sign of the data symbols, but only on the number of positive and negative ones. Denote $SF_1/SF_2$ as N, then the probability that i out of N transmitted $SF_2$ symbols will be different is expressed in terms with the binomial coefficient as $$2\binom{N}{i}/2^N$$

where the extra factor of 2 reflects the fact that negative and positive are equivalent. The corresponding mean is (N−2i) $\mu_2$. Therefore, $$E[|S_1|] = 1/2^{N-1}\left[\binom{N}{0}\{N\mu_2 \cdot \text{erf}(N\mu_2/\sqrt{2}\sqrt{N}\sigma_2) + \sqrt{N}\sqrt{(2/\pi)}\sigma_2 \exp(-N^2\mu_2^2/2N\sigma_2^2)\} + \binom{N}{1}\{(N-2)\mu_2 \cdot \text{erf}((N-2)\mu_2/\sqrt{2}\sqrt{N}\sigma_2) + \sqrt{N}\sqrt{(2/\pi)}\sigma_2\exp(-(N-2)^2\mu_2^2/2N\sigma_2^2)\} + \ldots + \binom{N}{N/2-1}\{2\mu_2\cdot\text{erf}(2\mu_2/\sqrt{2}\sqrt{N}\sigma_2)+\sqrt{N}\sqrt{(2/\pi)}\sigma_2\exp(-2\mu_2^2/2N\sigma_2^2)\} + \binom{N}{N/2}\{1/2\sqrt{N}\sqrt{(2/\pi)}\sigma_2\}\right]$$

or by normalizing with $\sqrt{2}\sigma_2$ $$E[|S_1|] = 1/2^{N-1}\left[\binom{N}{0}\{N\sqrt{SNR}\text{erf}(N\sqrt{SNR})+\sqrt{N}\sqrt{(1/\pi)}\exp(-NSNR)\} + \binom{N}{1}\{(N-2)\sqrt{SNR}\text{erf}((N-2)\sqrt{SNR}/\sqrt{N}) + \right.$$

-continued $$\left. \sqrt{N}\sqrt{(1/\pi)}\sigma_2\exp(-(N-2)^2SNR/\sqrt{N})\} + \ldots + \binom{N}{N/2-1}\{2\sqrt{SN}\text{Rerf}(2\sqrt{SNR}/\sqrt{N})+\sqrt{N}\sqrt{(1/\pi)}\exp(-2^2SNR/N)\} + \binom{N}{N/2}\{1/2\sqrt{N}\sqrt{(1/\pi)}\}\right]$$

The mean for $DS_2$ after accumulation over N symbol periods is equal to N times the mean over one symbol period, and because of the scaling by $(1/N)^{1/2}$ (for noise mean component normalization), the mean is $$\sqrt{N}\,E[|S_2|] = \sqrt{N}\mu_2\,\text{erf}(\mu_2/\sqrt{2}\sigma_2)+\sqrt{N}\sqrt{(2/\pi)}\sigma_2\exp(-\mu_2^2/2\sigma_2^2)$$

or, by normalizing with $\sqrt{2}\sigma_2$:

$$\sqrt{N}\,E[|S_2|]=\sqrt{N}\sqrt{SNR}\,\text{erf}(\sqrt{SNR})+\sqrt{N}\sqrt{(1/\pi)}\exp(-SNR)$$

The variance of $DS_2$, after accumulating over N symbol periods and normalizing, is $$\text{Var}[|S_2|]=\sigma_2^2+\mu_2^2-E[|S_2|]^2.$$

The variance of $DS_1$ is $$\text{Var}[|S_1I|] = \mu_2^2/2^{N-1}\sum\binom{N}{i}(N-2i)^2 + N\sigma_2^2 - E[|S_1I|]^2.$$

5. Estimation Methods

The larger variance for the incorrect hypotheses will not be an issue for SF estimation because DS is ultimately obtained over hundreds of symbols (for an observation period of 4 slots, the smallest number of symbols is 10 per slot when SF=256 and thus totals 40 symbols). It is the mean value of the various hypotheses for each of the M=7 possible SF values that will determine the detection strategy. Since the mean DS value of each hypothesis depends on the correct SF and the hypothetical SF being tested, the mean values need to be computed for each SF separately. The post-processing of the averaged absolute values after MRC for each possible SF should be such that the final DS for the correct SF hypothesis achieves maximum distance from the final DS's for all incorrect SF hypotheses and the distance among incorrect hypotheses is practically the same.

The objective of any SF estimation method is to ensure that the probability of incorrect SF estimation is substantially smaller than the corresponding FER and preferably smaller than the TFCI codeword decoding error rate. Also, SF estimation should be performed in the shortest possible observation period in order to maximize its benefits. Clearly, the observation period cannot exceed 15 slots, or 1 frame period, because the SF can then be determined from the TFCI. The maximum observation period determines the number of samples that need to be stored before despreading and the goal is to limit this value to 50% or less of the frame period. The observation period depends on the environment, due to the dependence of the DS reliability on the SNR variations, and on the actual SF's to be determined because this specifies the number of symbols in the observation period. Large SF's (e.g. 256, 128) require long observation periods because of the corresponding low data rate. Small SFs (e.g. 4, 8, 16) require shorter observation periods because of the corresponding high data rate. If the minimization of the observation period is preferable to the estimation of each possible SF value, the SF estimation process can be used to determine the maximum SF value that can be reliably decided for the specified observation period. For example, assume that for an observation period of 4 slots the SF determination can be performed with the required reliability for SF=4, 8, 16, 32, and 64 but not for SF=128 and 256. Then, if the SF is determined to be 64 or larger, despreading may proceed with SF=64. If at the end of the frame the actual SF is determined to be 128 or 256, the MRC results based on SF=64 can be appropriately combined. This implies that the MRC results need to be stored if the SF is determined to be larger than 64, but the size of the memory is smaller by a factor of 16 relative to the always possible option of despreading with SF=4 and storing the corresponding MRC results for combining at the end of the frame.

There are several methods for post-processing of the decision statistics, each defining a corresponding preferred embodiment SF estimation method. The objective is to ensure the equivalence of incorrect decision statistics while achieving a larger metric for the correct one. FIGS. 2–3 illustrate the common steps for preferred embodiment SF estimation methods and include the steps of: (a) Despreading with multiple SF's and performing MRC; (b) Taking the absolute value of MRC output; (c) Weighting the absolute value with the SNR estimate at the corresponding time period; and (d) Accumulating the weighted decision statistics over the entire observation period. Notice that because the Walsh code for each possible spreading factor is simply a repetition of the Walsh code for SF=4, all statistics can be obtained with only one despreading process. Two preferred embodiment post-processing methods for the decision statistics obtained after step (d) will be described in detail. The first is based on the ratios of the decision statistics while the second is based on a linear combination of them.

6. First Preferred Embodiment

The first preferred embodiment method evaluates the ratio $R(SF_1)=D(SF_1)/D(SF_1/2)$ where $D(SF)$ is the decision statistic DS after step (d) for SF. The ratios $R(SF_1)$ for M=7 hypothesized SF's for each actual SF are shown in FIGS. 4.1–4.7. In particular, FIG. 4.1 shows the case of the actual SF=256 and the ratios $R(SF_1)$ with $SF_1$=4, 8, 16, 32, 64, 128, 256, and 512 where estimates for D(512) and D(2) were used in R(512) and R(4), respectively, instead of actual despreading with SF=512 and SF=2. Similarly, FIG. 4.2 shows the same ratios but for the case of the actual SF=128, and so forth down to FIG. 4.7 which shows the same ratios for the case of the actual SF=4.

Several observations can be made from FIGS. 4.1–4.7. First, for $SF_1$ equal the actual SF, the ratio $R(SF_1)$ is the largest and $R(2SF_1)$ is the smallest. Second, for SF's smaller than the actual $SF_1$, the value of R(SF) decreases as the SF decreases while for SF's larger than the actual $SF_1$, the value of R(SF) remains approximately the same and equal to $1/\sqrt{2}$ for the SNR's in the range of interest. This reflects the statistical averaging of the data symbols for SF's larger than the actual one. Third, the ratio R(SF) for actual $SF_1$ equals R(2SF) for actual $2SF_1$. Fourth, the difference $R(SF_1)-R(2SF_1)$ is positive and the largest for $SF_1$ the actual SF, while for other SF's, the difference R(SF)-R(2SF) is either negative or zero.

The decisions for the first preferred embodiment method using R(SF) are based on the previous observations. In addition to R(SF), the differences R(SF)-R(2SF) are also computed and serve as the primary post-processing statistic for other first preferred embodiment methods. The nature of R(SF)-R(2SF) is similar to the statistic for orthogonal signaling. This is most clearly observed for $SF_1$=8 where all other differences are essentially equal to zero while the difference R(8)-R(16) is positive. If R(SF)-R(2SF) is not zero, it is negative (a small negative value compared with the positive value for the correct $SF_1$) and this in effect adds to the $R(SF_1)-R(2SF_1)$ for the actual $SF_1$. The differences of the ratios for the various SF's are presented in FIGS. 5.1–5.7.

In order to have a complete set for the differences R(SF)-R(2SF), the statistics for SF=512 and SF=2 need also be obtained. However, simplifications can apply for both SF=512 and SF=2 as follows.

For all SF's and the SNR range of interest (<10 dB), R(512) is practically equal to $1/\sqrt{2}$ except for actual $SF_1$=256. Even then, R(512) becomes considerably smaller than $1/\sqrt{2}$ only for large SNR values where the decision statistics are reliable and the SF estimation can be made with R(256)-R(512) being smaller by 0.0–0.05 compared to its actual value. A fixed value for R(512) is also beneficial because the computation of R(512) in the case of actual $SF_1$=256 would have low SNR and thus large variance. FIGS. 4.1–4.7 and 5.1–5.7 assume a value of R(512) equal to $1/\sqrt{2}$.

A simplification similar to the one for SF=512 can be made for SF=2. Based on the SNR measurements during a particular slot, the value of R(2) can be set to its theoretical one for SF=4. The decisions for the SF will be based on the difference between the R(SF)'s and the effect of the approximation for SF=2 is to benefit the decision for every SF other than SF=4. For SF=4 the approximation provides results that are practically equivalent to the actual ones. FIGS. 4.1–4.7 and 5.1–5.7 assume this approximation for R(2).

The first preferred embodiment methods' decision for the SF can be based on only the difference between the R(SF)'s as previously described. Alternatively, more elaborate schemes can be devised based on both the differences between the R(SF)'s of FIGS. 5.1–5.7 and the actual R(SF) values of FIGS. 4.1–4.7.

More particularly, a first preferred embodiment blind SF estimation system for 3GPP uplink in FDD mode could proceed as follows. (1) At the start of a frame in the data channel (DPDCH) received from a user, begin applying the scrambling code and the spreading code (repeating +1 +1 −1 −1) in a Rake detector, and at intervals of $2^i$ chips take the accumulated sum as an $S_i$ value, then take the magnitudes $|S_i|$ of the soft outputs to start generating the various decision statistics $DS(2^i)$. (2) Once P symbols for SF=$2^i$ have been received (that is, after P intervals of $2^i$ chips in which the intervals may be separated by unused intervals), compute the ratio $R(2^i)=DS(2^i)/DS(2^{i-1})$ and compare this to the other ratios already computed (which correspond to smaller powers of 2) for a decision opportunity: if $R(2^{i-1})-R(2^i)$ exceeds a positive threshold (such as 0.1), then decide the spreading factor for the frame as SF=$2^{i-1}$; whereas if $R(2^{i-1})-R(2^i)$ is about 0 or negative, then the SF decision is deferred until $R(2^{i+1})$ is tested; and so forth. See FIGS. 5.1–5.7. Note that when $R(2^{i-1})-R(2^i)$ is about 0 or negative and more accumulating is occurring, the previously computed DS(4), DS(8), . . . , DS($2^i$) may be recomputed to increase accuracy of the ratio differences $R(2^{i-1})-R(2^i)$.

Alternatively, in addition to $R(2^{i-1})-R(2^i)$ exceeding a positive threshold, a decision can include testing $R(2^i)$ to be at most about $1/\sqrt{2}$.

Further first preferred embodiments proceed as follows. Initially, find two candidate SF's, $SF_2$ and $SF_3$, by taking $SF_2$ so that $R(SF_2)-R(2SF_2)$ is the largest ratio difference and $SF_3$ so that $R(SF_3)-R(2SF_3)$ is the second largest. Next, decide SF to be $SF_2$ if $R(SF_2)$ is at least a threshold percentage (e.g., 7–10%) larger than $R(SF_3)$ and conversely to be $SF_3$ if $R(SF_3)$ is at least a second threshold percentage (e.g., 7–10%) larger than $R(SF_2)$. However, if the ratios are within threshold percentages of each other, then decide SF to be $SF_2$ when $R(SF_2)-R(2SF_2)$ is at least another threshold percentage (e.g., 8–12%) larger than $R(SF_3)-R(2SF_3)$. Then if none of the previous decision conditions holds, and if either $R(SF_2)$ or $R(SF_3)$ is a further threshold percentage (e.g., 2–3%) larger than the other, then take SF to the one with the larger ratio. Lastly, if no decision has been made by the foregoing, take $SF=SF_2$.

7. Second Preferred Embodiments

The second preferred embodiment methods post-process the decision statistics according to the formula $$F(SF)=F(i)=[DS(i)-\alpha DS(i+1)]/\beta^{7-i}$$

where $SF=2^i$, $i=2, 3, \ldots, 8$ and $\alpha$, $\beta$ are real numbers. Using similar arguments as with the observations in the first preferred embodiment methods, the factor a is selected equal to $\sqrt{2}$. The result of this will be that if the actual SF is smaller than the ones considered in the above expression, F(SF) will be zero. The factor $\beta$ can also be viewed as a weighting factor, trying to compensate among the different levels of reliability for the decision statistics. A value of $\beta$ larger than 1.0 assists the decision statistics for the larger SF's while a value of $\beta$ smaller than 1.0 assists the decision statistics for the smaller SF's.

As with the first preferred embodiment methods, the values for SF=512 and SF=2 are also needed. Using similar arguments, despreading for SF=512 can be avoided and F(256) can be set to 0.0. For SF=2, despreading can also be avoided by setting SF(2) to its theoretical value, for the measured SNR during the particular slot, for a hypothetical SF=4. This will produce accurate results when the actual SF=4. For all other values of the actual SF, F(2)=DS(2)-DS(4) will be larger than its actual value and will typically be the largest value. This is, however, beneficial for the final decisions which will be based on F(SF)-F(SF/2). Thus, the previous setting for F(2) will actually improve the estimation of all SF's greater than 4, and will produce accurate results for SF=4. FIGS. 6.1–6.7 and 7.1–7.7 better illustrate this point. FIGS. 6.1–6.7 show the decision statistic for $\alpha=\sqrt{2}$ and $\beta=1.1$. The curves for F(2) and F(256) were based on the previously discussed approximation. The differences between decision statistics and their properties resemble the ones for the first method and similar observations apply. Notice that except for SF=4 and SF=8, F(2) is the largest for all other SF's with the second largest value attained for the actual SF. As with the first method, the decision for the SF can be based only on the difference between the F(SF)'s. Alternatively, both the difference between F(SF)'s (FIGS. 7.1–7.7) and the F(SF)'s may be considered. Because of the much larger reliability of the decision statistics for the smaller SF's as a result of more data symbols, the decision statistics for the smaller SF's do not need to be obtained for every symbol during the observation period. For example, for an observation period of 8 slots, the decision statistics for SF=256, SF=128, and SF=64 are obtained during every slot, for SF=32 and SF=16 they may be obtained only every other slot, while SF=8, and SF=4 they may be obtained during only 2 slots. This considerably simplifies the computational complexity of the SF estimation method since MRC for the smaller SF's need only be performed ¼ or ½ of the time.

8. Alternative Preferred Embodiments

Both first and second preferred embodiment SF estimation methods may be used simultaneously. Because of the different statistical properties of the corresponding decision statistics, the two methods may produce different SF decisions. If despreading occurs for both decided SF's, this can be used to reduce the overall SF estimation error rate. The final SF decision will be based on the TFCI and the incorrect despreading results will be dismissed. This implies that the MRC results for the smaller of the two different SFs are stored.

Because of the lower reliability and larger variance of the decision statistics during a given observation period, for SF=256 and SF=128, the resulting decisions are the least reliable and despreading for both SF=256 and SF=128 may be performed if either is decided. Using similar reasoning, if SF estimation errors for any particular SF are mostly caused by another specific SF (e.g. actual SF of 256 and SF causing most errors of 128), then despreading may occur for both such SF's. Again, in such cases, the final SF decision will be based on the TFCI assuming that the MRC results for the smaller of the two SFs are stored Likewise, the high data rate situation (multiple data channels) with more than one SF=4 code can be handled by despreading with all 3 of the possible SF=4 codes (+1+1−1−1, +1−1+1−1, and +1−1−1+1) when the decision is SF=4, and use the TFCI at the end to determine which of the results to use and which to discard. Another alternative is to despread with each of the possible SF=4 codes over a few slots, measure the SNR, and determine the code existence in that manner. Also notice that in the 3GPP uplink, compressed mode is supported only through SF reduction by a factor of 2 (no puncturing) and this poses no problem for SF estimation.

9. Experimental Results

Simulations with statistics accumulated over 8 slots and over 6 slots (i.e., varying P), with mobile speeds of 3, 30, and 100 km/h, Rayleigh fading, 1–2 multipaths, and 5, 7, or 10 uncoded bits generating the 30 TFCI coded bits yielded the following.

For an observation period of 8 slots, the preferred embodiment SF estimation methods have an error rate that is substantially smaller than the 10 or 7 uncoded bit TFCI decoding error rate even for the SF's of 256 and 128. The SF estimation error rate is in general comparable with the decoding error rate for a TFCI with 5 uncoded bits. Also, an observation period of 6 slots or smaller will generally suffice for the smaller SF's, and it will suffice for all SF's in slow Rayleigh fading, rich multipath environments, base stations with antenna diversity, or AWGN channels.

The SF estimation error rate for SF=256 and SF=128 will significantly decrease if despreading for either SF=128 or SF=256 continues after a respective decision for SF=256 or SF=128 is made. This is because the vast majority of errors for SF=256 are caused by deciding SF=128, while for SF=128 by deciding SF=256. By despreading both SF's a final decision can be made at a later instant or at the end of the frame. The penalty for despreading with both SF=128 and SF=256 is the additional memory required to store the extra symbols. This memory and the additional processing (MRC) are small because of the low data rate for these two SF's. An additional benefit is that the observation period may then be decreased to about 6 slots or less. A compromise between longer observation periods and SF estimation may be to determine whether the SF is smaller than 64. If it is, the actual SF is determined. If it is not, despreading can be performed with SF=64 and the results combined once the actual SF becomes known at the end of the frame. This is the same as despreading with SF=64 and combining the results at the end of the frame, only now the required processing and memory are much smaller.

In short, the preferred embodiment blind SF estimation methods are viable in 3GPP because their reliability is better than the frame error rate and comparable to the TFCI decoding error rate. The associated complexity is small because the operations needed are a single despreading, MRC, computation of the absolute MRC values, and accumulation of the absolute values over several slots. A DSP can process the final values and make an SF decision. An observation period of 5–8 slots produces the desired results. This translates to a reduction of about 50–67% in the buffer size and data transfer rate as compared to relying upon TFCI decoding SF determination. The observation period can be reduced to 5 slots or less if both SF=128 and SF=256 are despread when a decision for either is make. Further reductions may also be possible for base stations employing antenna diversity.

10. Modifications

Several modifications of the preferred embodiment SF estimation methods may be devised while retaining the feature of steps like (a) Despreading with all possible SF's (and performing MRC of resolved multipaths); (b) Taking the absolute values of (MRC) outputs; (c) Weighting the absolute values with the SNR estimate for the corresponding time period; (d) Accumulating the weighted absolute values to generate decision statistics; and (e) Use the decision statistics for the various spreading factors to decide on an SF estimate. Step (c) is also optional.

For example, various quantities can be changed, such as P (the number of symbols averaged for DS); M (the number of possible spreading factors); the number of slots over which the (MRC) outputs are accumulated which may adapt to the SNR; other formats with differing number of chips per slot, number of slots per frame; different spreading code structures with the case of the codes for smaller SF's imbedded in the codes of larger SF's permitting the use of a single Rake detector; and so forth.

What is claimed is:

1. A method for determining the spreading factor in a code division multiple access communication system comprising:
   (a) despreading with a plurality of the possible spreading factor codes, said despreading includes performing maximal-ratio-combining of despread multipaths;
   (b) taking the absolute values of said despreading results of step (a); and
   (c) making a spreading factor decision from said absolute values of step (b).

2. The method of claim 1, wherein:
   (a) said absolute values are weighted with a signal-to-noise ratio estimate.

3. The method of any of claims 1 and 2, wherein:
   (a) said absolute values for a spreading factor are accumulated.

4. The method of claim 1, wherein:
   (a) said making a decision of step (c) includes comparing the ratios said absolute values for differing spreading factors.

5. The method of claim 1, wherein:
   (a) said making a decision of step (c) includes comparing weighted linear combinations of ratios said absolute values for differing spreading factors.

6. A method of despreading, comprising:
   (a) despreading with a plurality of the possible spreading factor codes;
   (b) taking the absolute values of said despreading results of step (a);
   (c) making a first spreading factor decision and a second spreading factor decision from said absolute values of step (b);
   (d) when said decision of step (c) is a first spreading factor and said second decision is a second spreading factor, then despreading with both said first and second spreading factors, and when said first and second decisions of step (c) are both equal to a third spreading factor, then despreading with said third spreading factor.

7. The method of claim 6, wherein:
   (a) said despreading includes performing maximal-ratio-combining of despread multipaths.

8. The method of any of claims 6 and 7, wherein:
   (a) said absolute values for a spreading factor are accumulated.

9. A method of despreading, comprising:
   (a) despreading with a plurality of the possible spreading factor codes;
   (b) taking the absolute values of said despreading results of step (a);
   (c) making a spreading factor decision from said absolute values of step (b);
   (d) when said decision of step (c) is a first spreading factor, then despreading with spreading factors larger than said first spreading factor.

10. The method of claim 9, wherein:
    (a) said despreading includes performing maximal-ratio-combining of despread multipaths.

11. The method of any of claims 9 and 10, wherein:
    (a) said absolute values for a spreading factor are accumulated.

12. A method of despreading, comprising:
    (a) despreading with a plurality of the possible spreading factor codes;
    (b) taking the absolute values of said despreading results of step (a);
    (c) making a spreading factor decision from said absolute values of step (b) wherein the absolute values are taken over differing time intervals for differing spreading factors.

13. The method of claim 12, wherein:
    (a) said despreading includes performing maximal-ratio-combining of despread multipaths.

14. The method of any of claims 12 and 13, wherein:
    (a) said absolute values for a spreading factor are accumulated.

15. A code division multiple access communication system, comprising:
    (a) an antenna;
    (b) a demodulator coupled to said antenna;

(c) a processor coupled to said demodulator and programmed to: (i) despread with a plurality of the possible spreading factor codes, (ii) take the absolute values of said despread results of step (i), and (iii) make a spreading factor decision from said absolute values of step (ii); and (d) an output coupled to said processor to output results of said programmed despreading with the spreading factor according to the decision of step (iii).

* * * * *